United States Patent [19]

Umetsu et al.

[11] Patent Number: 5,148,201
[45] Date of Patent: Sep. 15, 1992

[54] ZOOMING CONTROL APPARATUS FOR A CAMERA

[75] Inventors: Takao Umetsu; Shunji Nishimura, both of Saitama, Japan

[73] Assignee: Fuji Photo Film Co., Ltd., Kanagawa, Japan

[21] Appl. No.: 704,974

[22] Filed: May 23, 1991

[30] Foreign Application Priority Data

May 28, 1990 [JP] Japan .................................. 2-137634

[51] Int. Cl.$^5$ ............................ G03B 1/18; G03B 3/00
[52] U.S. Cl. .................................. 354/195.1; 354/400
[58] Field of Search ............... 354/400, 195.1, 195.12; 352/140, 142, 175

[56] References Cited

U.S. PATENT DOCUMENTS

| | | | |
|---|---|---|---|
| 4,002,405 | 1/1977 | Stahl | 354/195.1 |
| 4,046,465 | 9/1977 | Toyama et al. | 352/175 |
| 4,896,179 | 1/1990 | Watanabe et al. | 354/195.1 |
| 4,972,215 | 11/1990 | Kitamura et al. | 354/195.1 |

Primary Examiner—Russell E. Adams
Assistant Examiner—Jal Noh
Attorney, Agent, or Firm—Young & Thompson

[57] ABSTRACT

A zoom lens is zoomed selectively in either of two opposite directions by a motor which is rotated by a driver. First and second zoom switches cause the zoom lens to move at a higher speed. Third and fourth zoom switches cause the zoom lens to move at a lower speed for precisely stopping the zoom lens. A CPU connected to the four switches controls a zoom motor to rotate selectively at higher and lower speeds. The first and third zoom switches cause the zoom lens to move in the direction of telephotography, while the second and fourth zoom switches cause the zoom lens to move in the direction of wide-angle photography. In order to keep the speed of the zoom lens unchanged despite the difference in its direction, an electric current of a larger electric power is applied to the motor for rotation in the direction that requires more work.

16 Claims, 6 Drawing Sheets

ZOOMING CONTROL APPARATUS FOR A CAMERA

BACKGROUND OF THE INVENTION

1. Field of the Invention

The present invention relates to a zooming control apparatus for a camera, more particularly to a zooming control apparatus capable of changing the zooming speed of the zoom lens.

2. Description of the Prior Art

Zoom lens assemblies are well known, which are zoomed by a zoom motor to change the focal length thereof. Zoom lenses are widely used as taking lenses for photographic cameras or electronic still cameras, the zoom lens being actuated by a zoom motor. In such a zoom lens, zoom switches are provided for zooming in opposite directions for telephotography and wide-angle photography (herein referred to as the Tele direction and the Wide direction) by controlling the rotation of the motor. When the switch is operated, the zoom lens is zoomed at a constant speed in the Tele or Wide direction.

In such a conventional zoom lens, however, the speed of zooming is kept constant, so that it is impossible to satisfy simultaneously two opposite desires, namely, to quickly complete the zooming operation, and to stop the zoom lens precisely in a desired zooming position

SUMMARY OF THE INVENTION

It is therefore an object of the present invention to provide a zooming control apparatus capable of zooming the zoom lens quickly to a desired zooming position.

It is another object of the present invention to provide a zooming control apparatus capable of stopping the zoom lens precisely in the desired zooming position.

In order to achieve the above and other objects and advantages of this invention, a zooming control apparatus having a motor for actuating a zoom lens is provided with first switching means operable for zooming at a first high speed, and second switching means operable for zooming at a second low speed. Motor control means is provided for controlling the rotary speed of the motor in accordance with a signal from the first or second switching means.

According to a preferred embodiment, a first switch is provided for zooming the zoom lens at the first or high speed in the Tele direction. A second switch is provided for zooming the zoom lens at that first speed in the Wide direction. A third switch is provided for zooming the zoom lens at the second or low speed in the Tele direction. A fourth switch is provided for zooming the zoom lens at that second speed in the Wide direction. The motor control means is constituted by a CPU for monitoring the condition of operation of the first to fourth switches and for generating a motor control signal according to the switch being operated, and a driver for supplying the motor with one of four driving electric currents of different pulse duty factors in accordance with the motor control signal.

Zooming can thus be fast enough to complete the zooming operation quickly, as well as slow enough to keep high the precision of stopping of the zoom lens in the desired zooming position.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT

Figure 1:
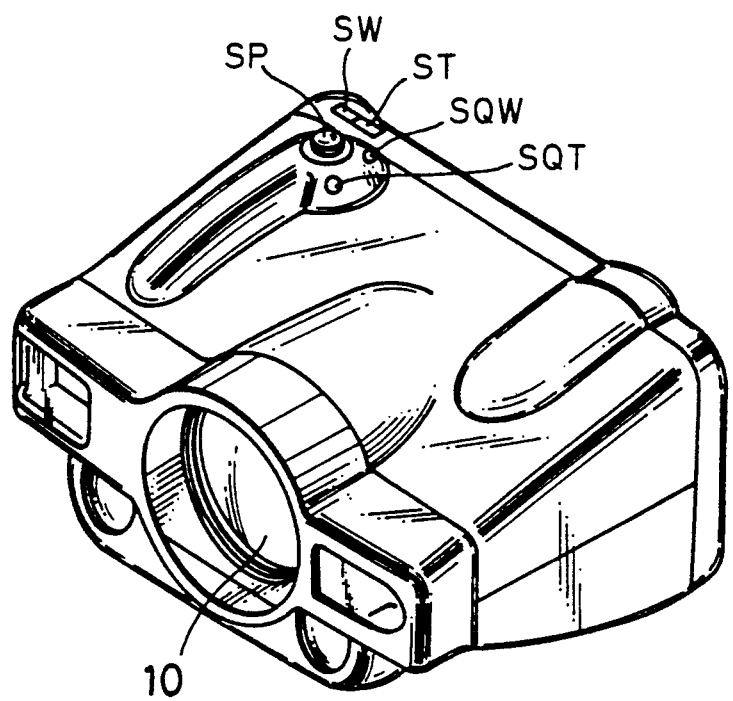
FIG. 1 is a perspective view illustrating a camera in which a zoom lens controlling apparatus according to the present invention is incorporated.

As is shown in FIG. 1 illustrating a camera in which a zoom lens controlling apparatus of the present invention is incorporated, four zoom switches SQT, SQW, SW and ST are mounted on the body of the camera. The switches SQT and SQW serve for zooming a zoom lens 10 at a high sped respectively in the Tele and Wide directions. The switches ST and SW serve for zooming the zoom lens 10 at a low speed respectively in the Tele and Wide directions. The switches SQT, SQW, ST and SW are arranged in the vicinity of a shutter release button SP. The zoom lens 10 used as a taking lens consists of a lens system having at least two lens groups, and lens barrels for holding the lens system.

Figure 2:
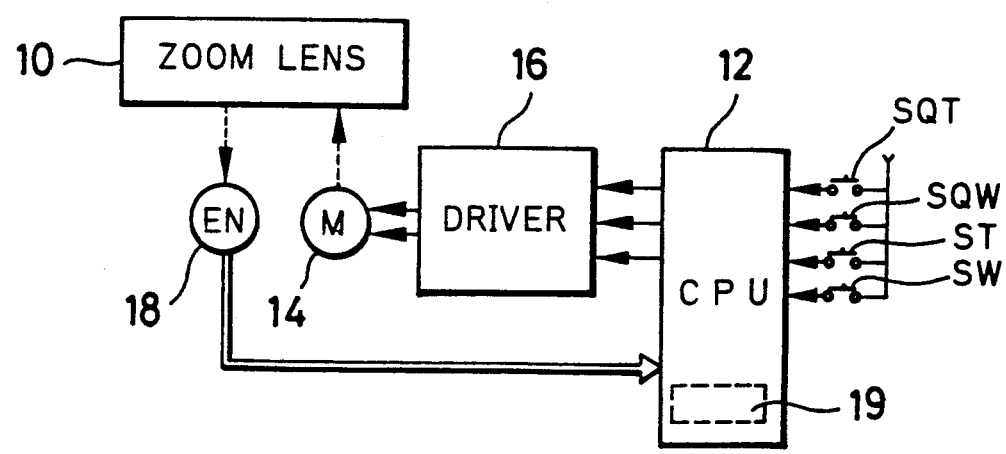
FIG. 2 is a block diagram schematically illustrating the controlling apparatus of the camera of FIG. 1.

In FIG. 2 schematically illustrating the control apparatus, a CPU (central processing unit) controls the zoom lens 10 through a motor 14 and a driver 16 for zooming in accordance with the operation of the switches SQT, SQW, ST and SW. The CPU 12 supplies signals for controlling the actuation, the direction of rotation and the speed of rotation of the zoom motor 14 to the driver 16. The driver 16 controls the direction and speed of rotation of the zoom motor 14 by changing the direction and the duty factor of the electric current supplied to the zoom motor 14 in accordance with the signals from the CPU 12. The zoom motor 14 is rotated for high speed zooming with a continuous drive and with a pulse duty factor of 100%, or, for low speed zooming, with a pulsed drive in which the motor 14 is rotated intermittently between active and inactive states with pulses of a duty factor less than 100%.

The zooming position taken by the zoom lens 10 is detected by an encoder 18. A code signal representing the detected zooming position is supplied to the CPU 12. Reference numeral 19 designates a timer incorporated in the CPU 12 for measuring time passed after operating the switches in order to detect any abnormality in zooming.

Figure 3:
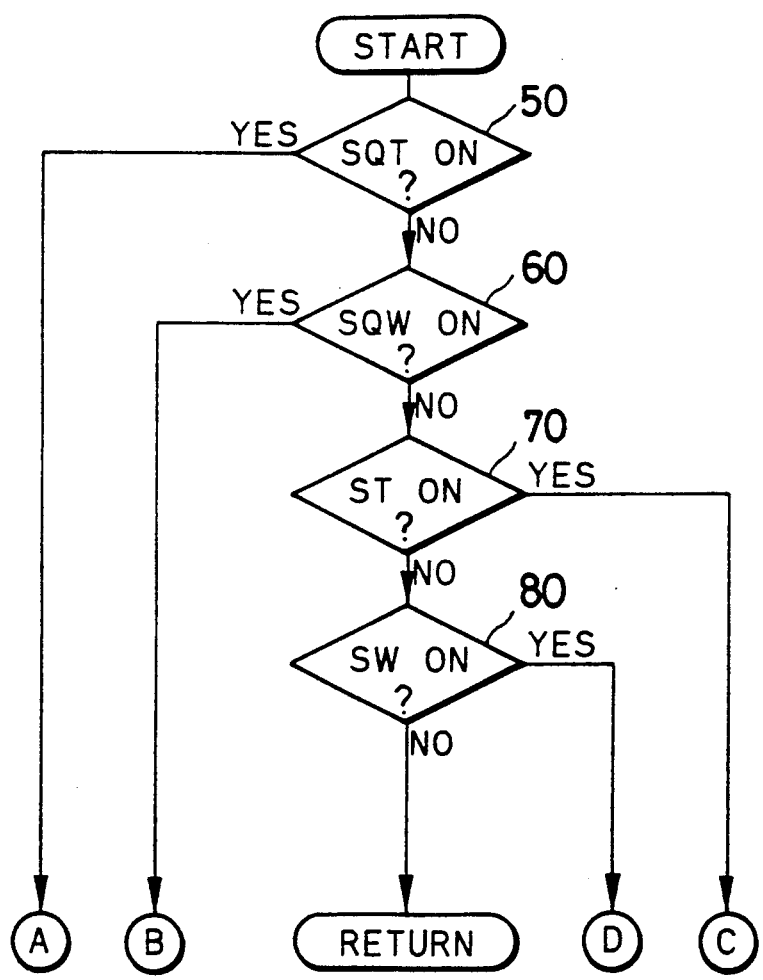
FIG. 3 is a flow chart illustrating the sequence in which a CPU illustrated in FIG. 2 scans the condition of the zoom switches.

The operation of the CPU 12 will now be described in detail with reference to FIGS. 3 to 7. The CPU 12 scans the operation of the switches SQT, SQW, ST and SW as illustrated in FIG. 3. When one of the switches is judged to be on at any of the steps 50, 60, 70 and 80, a zooming operation corresponding to the actuated switch is effected.

Figure 4:
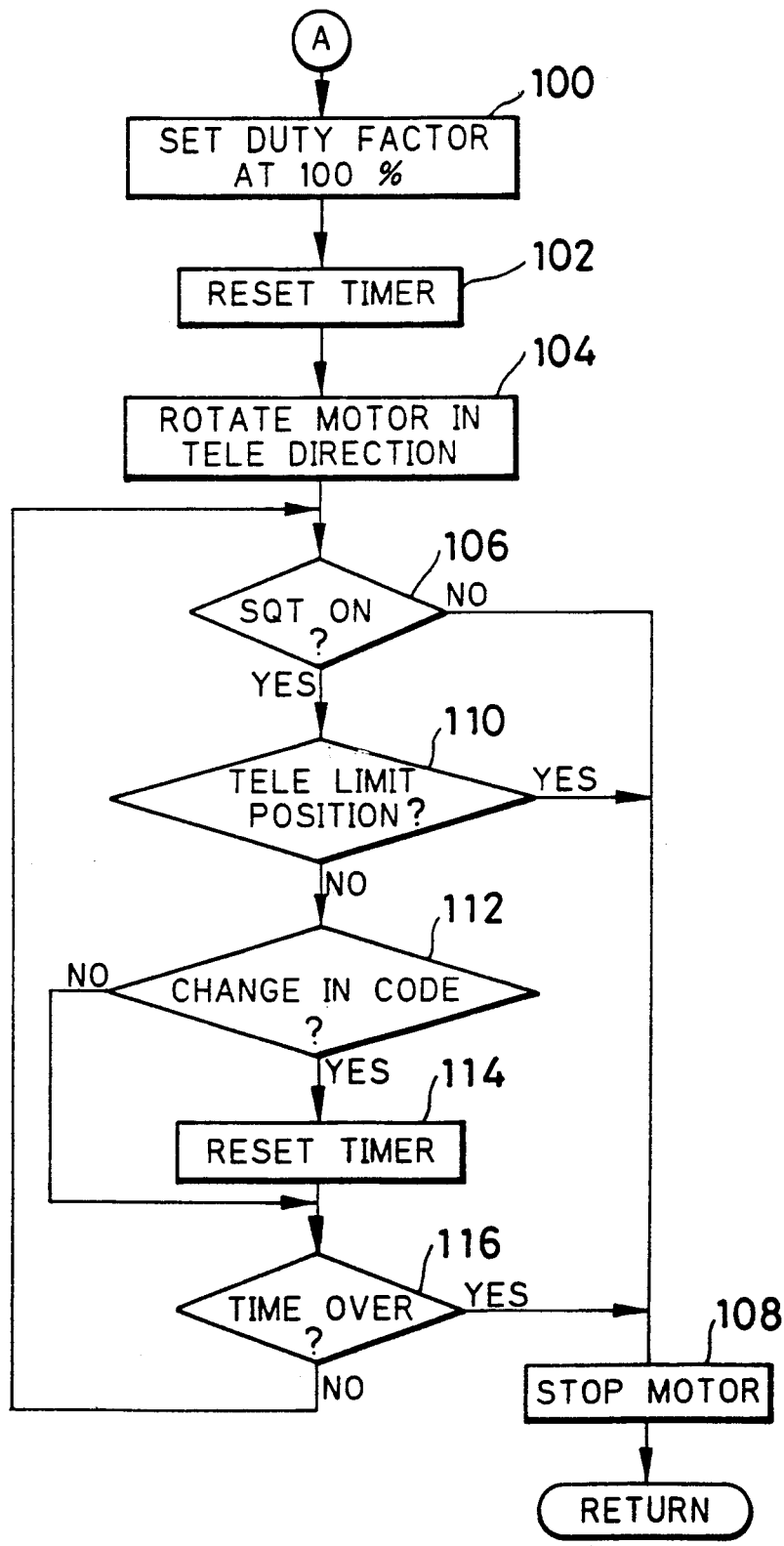
FIGS. 4 and 5 are flow charts illustrating the sequence of the CPU illustrated in FIG. 2 for operating switches for zooming at high speed in the Tele and Wide directions, respectively.

If the switch SQT is on at the step 50, then the operation follows the sequence illustrated in FIG. 4. The duty factor of the pulses for rotating the zoom motor 14 at high speed is set to be 100% in a step 100. The timer 19 is reset in a step 102. The zoom motor 14 begins rotation in the Tele direction at the duty factor 100% in a step 104. Because the zoom motor 14 is rotated continuously, the zoom lens 10 starts zooming at the high speed in the Tele direction. It is judged in a step 106 whether the switch SQT is still on. If the switch SQT is judged to be off, then the zoom motor 14 is stopped in a step 108 to return the operation to the start of the sequence illustrated in FIG. 3. If the zoom switch SQT is still on at step 106, then it is judged in a step 110 whether the zooming position has reached the zooming limit position on the side of telephotography, or a zooming position wherein the focal length is set to be the longest, in accordance with a code signal from the encoder 18. If the zoom lens 10 is in the limit position for telephotography, then the zoom motor 14 is stopped to return to the start of the sequence. If the zoom lens 10 has not reached the limit position for telephotography in step 110, then it is judged in a step 112 whether there has been a change in the code signal from the encoder 18 or a change in the zooming position. If there has been such a change, then the timer 19 is reset in a step 114 and the sequence proceeds to a step 116. If there has been no change at step 112, then the operation directly proceeds to step 116 without resetting the timer 19. It is judged in step 116 whether a predetermined period of time has elapsed after resetting the timer 19 in step 102 o 114. If such a time is judged to have elapsed, the zoom motor 14 is stopped to return to the start of the sequence, because the timer 19 indicates that the zoom lens 10 has not moved for a certain period of time. If no time has elapsed at step 116, the operation returns to step 106 to repeat the process from step 106 to step 116.

There will now be described a case wherein the switch SQW is turned on in FIG. 3. The determination that the switch SQW is on, in step 60, is followed by the sequence illustrated in FIG. 5. The duty factor of pulses for rotating the zoom motor 14 is determined to be 90% in a step 200, because the zooming speed will be kept unchanged even though the energy consumed by zooming the zoom lens is less in the Wide direction than in the Tele direction. Specifically, the rotary speed in the Wide direction when rotating the zoom motor 14 at a duty factor of 90% will be the same as that in the Tele direction when rotating the zoom motor 14 at a duty factor of 100%. The large difference in the loads in the opposite directions is due to the difference in the work that must be performed to operate linkage in the camera between the lens system of the zoom finder and the taking lens system. That is, a movable lens element of the zoom finder must be moved against a spring when the zoom lens 10 is zoomed in the Tele direction. Steps which are the same as those shown in FIG. 4 are designated by the same reference numerals in FIG. 5.

The zoom motor 14 begins rotation in the Wide direction in a step 204. It is judged in a step 206 whether the switch SQW is still on. It is judged in a step 210 whether the zoom lens 10 has reached its limit position in the direction of wide-angle photography, i.e. a zooming position wherein the focal length is the shortest. If the switch SQW is off at step 206, or if the zoom lens 10 reaches the limit position of wide-angle photography in the step 210, then the zoom motor 14 is stopped to return to the start of the sequence. If the time is judged to have elapsed at step 116, then it is judged in a step 220 whether the duty factor of the pulses for rotating the zoom motor 14 is 100%.

When the time has elapsed, with the duty factor determined to be 90%, then the duty factor is changed to 100% in a step 222, because the timer 19 indicates an abnormality in zooming the zoom lens 10. This enlargement of the duty factor can serve to continue the zooming operation until a desired position has been reached, by deriving greater power from the zoom motor 14 even when the time has elapsed due to the discharge of the battery loaded in the camera. In a step 224, the timer 19 is reset to return the operation to step 206, wherein the zoom motor 14 is rotated continuously in the Wide direction with the duty factor of 90% changed to 100%. When the time has elapsed in step 220 after determining the duty factor to be 100%, then the zoom motor 14 is stopped to return to the start of the sequence.

Figure 5:
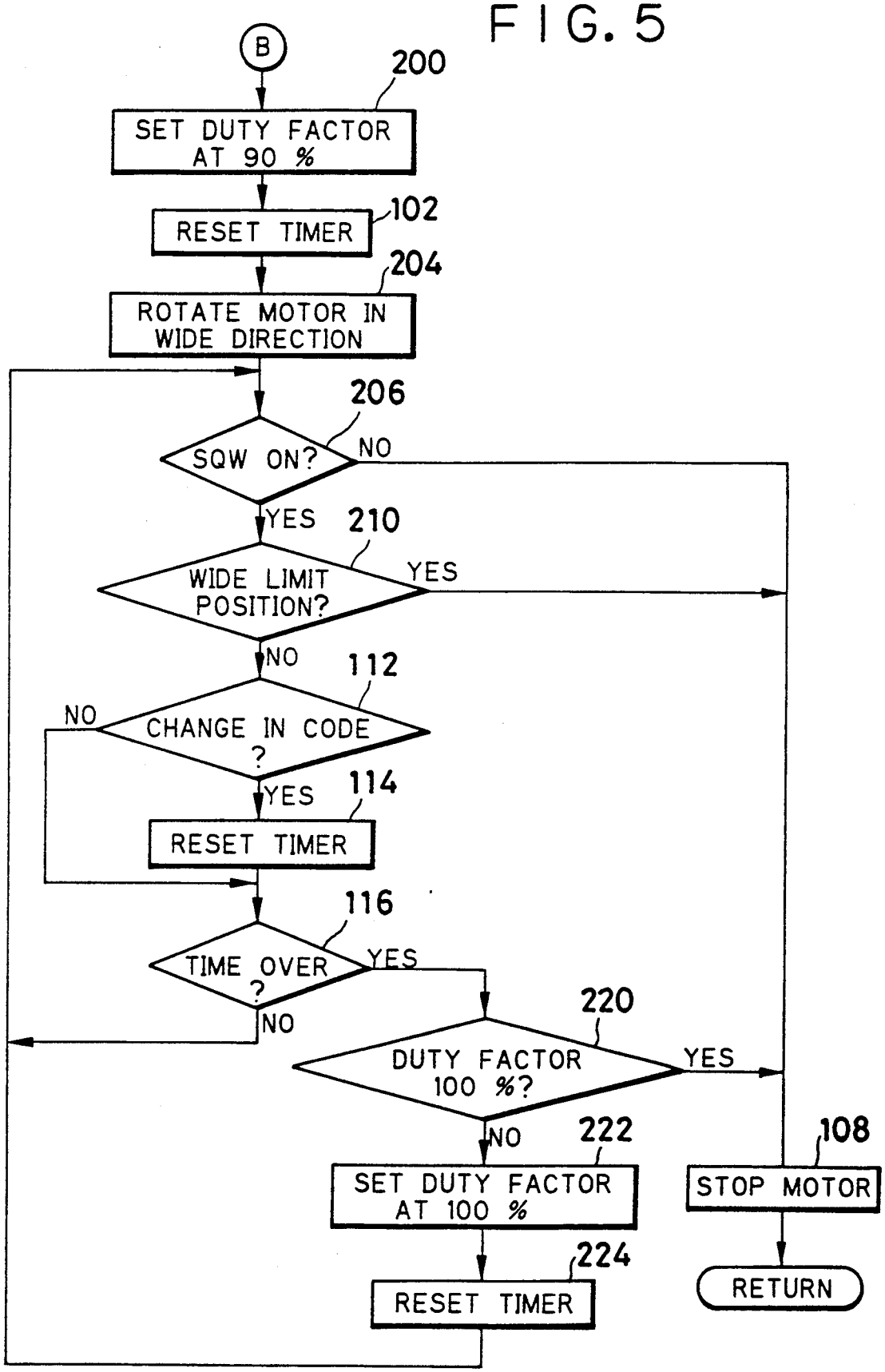

The operation after turning on the switch ST in Fig. 3 will now be described. The step 70 is followed by the sequence illustrated in FIG. 6. The duty factor for rotating the zoom motor 14 is determined to be 70% in a step 300. The zooming speed of the zoom lens 10 in the Tele direction is lower when actuating the switch ST than when actuating the switch SQT, because the duty factor is set to be less than 100%, which is the duty factor upon actuating the switch SQT. Steps which are the same as those shown in FIGS. 4 and 5 are designated by the same reference numerals in FIG. 6.

It is judged in a step 306 whether the switch ST is still on. If the switch ST is off, then the zoom motor 14 is stopped to return to the start of the sequence. The change in the duty factor after operating the switch ST is similar to that after operating the switch SQW. Specifically, when the time has first elapsed, the duty factor changes from 70% to 100% so as to rotate the zoom motor 14 at a high speed. When the time has again elapsed, the zoom motor 14 is stopped to return the operation to the start of the sequence.

The operation after turning on the switch SW in Fig. 3 will now be described. The step 80 is followed by the sequence illustrated in FIG. 7. The duty factor for rotating the zoom motor 14 is determined to be 60% in a step 400. The zooming speed of the zoom lens 10 in the Wide direction is lower upon actuating the switch SW than upon actuating the switch SQW, because the duty factor is determined to be less than 90%, which is the duty factor upon actuating the switch SQW. The duty factor 60% is even smaller than 70%, which is the duty factor upon actuating the switch ST, because the zooming speed will be kept unchanged in spite of the difference in the load that resists zooming the zoom lens 10 in the respective opposite directions. Specifically, the rotary speed in the Wide direction upon rotating the zoom motor 14 at a duty factor of 60% will be the same as that in the Tele direction upon rotating the zoom motor 14 at a duty factor of 70%. Steps which are the same as those shown in FIG. 5 are designated by the same reference numerals in FIG. 7.

It is judged in a step 406 whether the switch SW is still on. If the switch SW is judged to be off, then the zoom motor 14 is stopped to return to the start of the sequence. The change in the duty factor after operating the switch SW is similar to those upon operating the switches SQW and ST. Specifically, when the time has first elapsed, the duty factor changes from 60% to 100% so as to rotate the zoom motor 14 at a high speed. When the time has again elapsed, the zoom motor 14 is stopped to return the operation to the start of the sequence.

Although the duty factor of the pulses for rotating the zoom motor 14 is set to change the zooming speed of the zoom lens 10, it is possible that instead the current intensity applied to the zoom motor may be controlled for this purpose.

Figure 6:
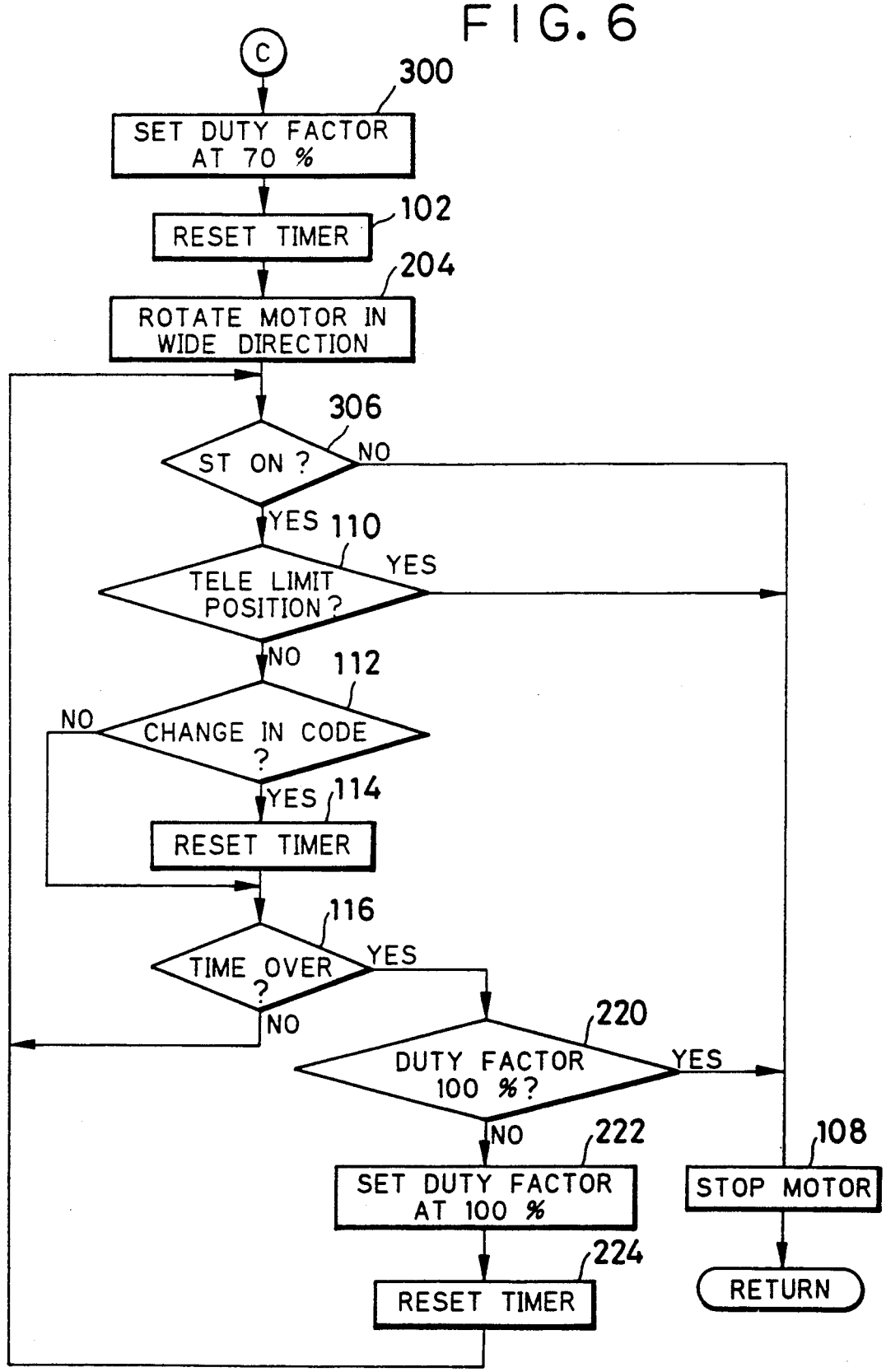
FIGS. 6 and 7 are flow charts illustrating the sequence of the CPU illustrated in FIG. 2 for operating switches for zooming at low speed in the Tele and Wide directions, respectively.
Figure 7:
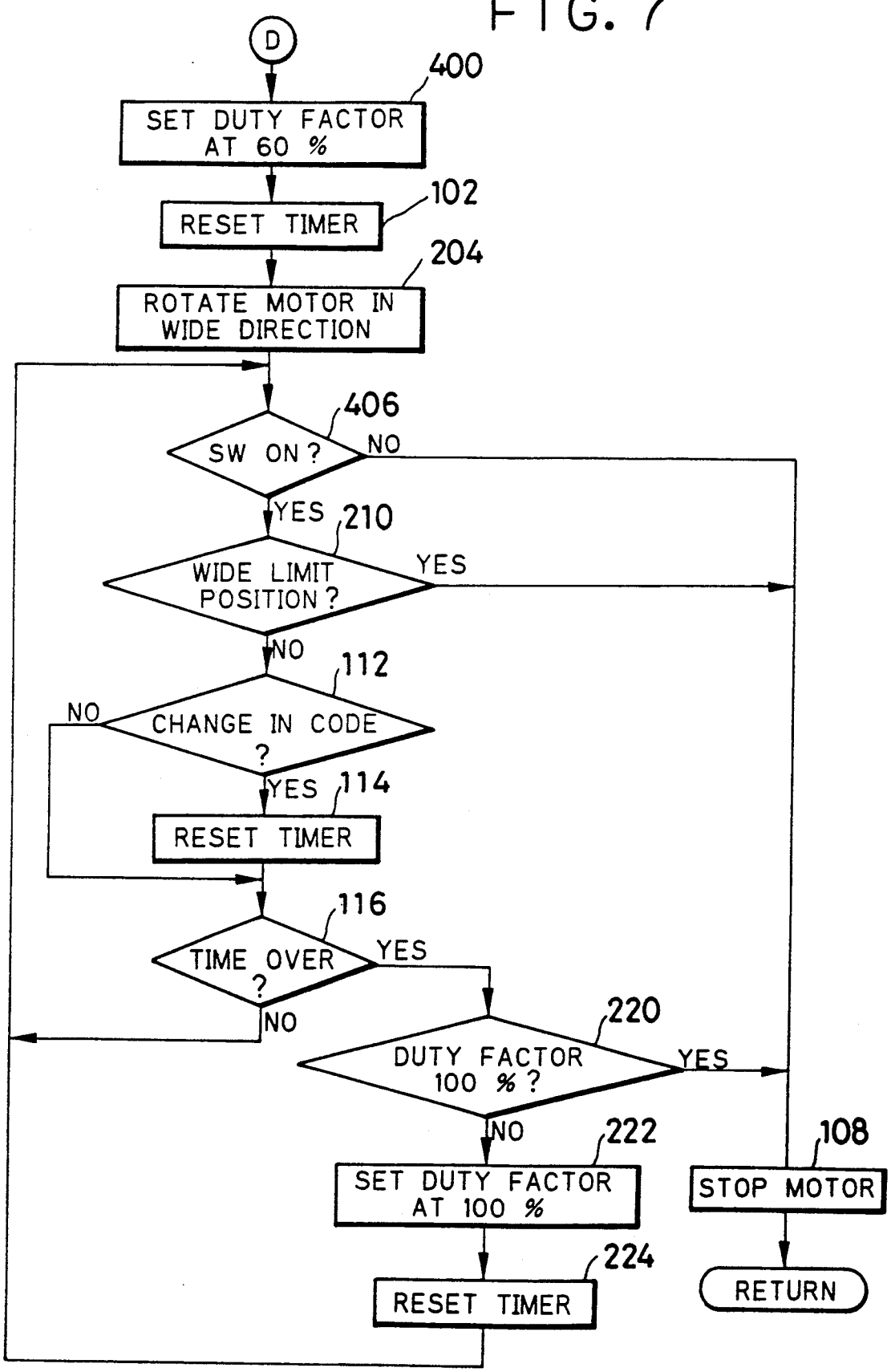

The time predetermined in the timer 19 is preferably set at two different lengths, of which the length of time in FIGS. 4 and 5 is set shorter than that in FIGS. 6 and 7, so that it is possible to prevent the zoom motor 14 from useless rotation.

Instead of the switches SQT, SQW, ST and SW, three switches may be provided on the camera each for telephotography, wide-angle photography and change in the zooming speed between high and low speeds, so that it is also possible to change the focal length in the two directions at the two speeds.

Although the present invention has been fully described by way of the preferred embodiment thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A zooming control apparatus for a camera having a rotary motor for actuating a zoom lens so as to change the focal length thereof, comprising:
    first switching means operable for zooming at a first high speed;
    second switching means operable for zooming at a second low speed;
    motor control means for controlling the speed of rotation of said motor in accordance with signals from said first and second switching means; and
    means for detecting the speed of movement of said zoom lens, said motor control means changing said detected zooming speed to said first speed when said detected speed is less than said second speed.

2. A zooming control apparatus as defined in claim 1, wherein said first and second switching means are disposed in the vicinity of a release operating member for actuating a shutter mechanism of a said camera.

3. A zooming control apparatus as defined in claim 1, wherein said motor control means supplies said motor with a first driving current of a high electric power while said first switching means is operated, and supplies said motor with a second driving current of a low electric power while said second switching means is operated.

4. A zooming control apparatus as defined in claim 3, wherein said first switching means includes a first switch for zooming said zoom lens in a direction of telephotography and a second switch for zooming said zoom lens in a direction of wide-angle photography; and said second switching means includes a third switch for zooming said zoom lens in said direction of telephotography and a fourth switch for moving said zoom lens in said direction of wide-angle photography.

5. A zooming control apparatus as defined in claim 4, wherein, in case the work to perform said zooming differs in opposite zooming directions, said motor control means supplies said motor with a third driving current of an electric power lower than said first driving current instead thereof at the time of zooming in a direction that requires lesser work in order to maintain said zooming speed at said first speed; and supplies said motor with a fourth driving current of an electric power lower than said second driving current instead thereof at the time of zooming in a direction that requires lesser work in order to maintain said zooming speed at said second speed.

6. A zooming control apparatus as defined in claim 5, further comprising an encoder for detecting the position of said zoom lens, said motor being stopped from being supplied with said driving currents even during operation of said first to fourth switches when said motor control means detects said zoom lens to be in a limit position of telephotography or wide-angle photography by referring to a signal supplied by said encoder.

7. A zoom control apparatus as defined in claim 6, further comprising a timer for measuring time elapsed since the beginning of zooming, said motor control means supplying said motor with said first driving current to increase the rotary torque of said motor when said motor control means detects said zoom lens in a position different form said limit positions of telephotography and wide-angle photography even upon the elapse of a predetermined period of time by referring to said elapsed time while zooming is effected by use of any of said second to fourth driving currents.

8. A zoom control apparatus as defined in claim 7, wherein said motor control means stops supplying said motor with said first driving current when said motor control means detects said zoom lens in a position different from said limit positions of telephotography and wide-angle photography even upon the lapse of a predetermined period of time by referring to said elapsed time while zooming is effected by use of said first driving current.

9. A zoom control apparatus as defined in claim 8, wherein said electric power is changed by changing a pulse duty factor thereof.

10. A zoom control apparatus as defined in claim 9, wherein $U_1 > U_2 > U_3 > U_4$, wherein $U_1, U_2, U_3$ and $U_4$ are pulse duty factors respectively of said first to fourth driving currents.

11. A zoom control apparatus as defined in claim 10, wherein $U_1$ is 100%, $U_2$ is 90%, $U_3$ is 70% and $U_4$ is 60%.

12. A zoom control apparatus as defined in claim 11, wherein said motor control means includes: a CPU for scanning the condition of operation of said first to fourth switches and for generating a motor control signal according to the said switch being operated; and a driver for supplying said motor with said first to fourth driving currents in accordance with said motor control signal from said CPU.

13. A zooming control apparatus for a camera for zooming a zoom lens to change the focal length thereof as desired, comprising:
    a motor for moving said zoom lens;
    a first switch operable for zooming said zoom lens at a first speed in a direction of telephotography;
    a second switch operable for zooming said zoom lens at said first speed in a direction of wide-angle photography;
    a third switch operable for zooming said zoom lens at a second speed lower than said first speed in said direction of telephotography;
    a fourth switch operable for zooming said zoom lens at said second speed in said direction of wide-angle photography;

a CPU for scanning the condition of operation of said first to fourth switches and for generating a motor control signal according to the said switch being operated;

a driver for supplying said motor with one of four driving electric currents differing as to pulse duty factor in accordance with said motor control signal;

an encoder for detecting the position of said zoom lens, said motor being stopped from being supplied with said driving currents even during operation of said first to fourth switches when said CPU judges that said zoom lens is in one of the limit positions of telephotography or wide-angle photography by referring to a signal supplied by said encoder; and a time for measuring time elapsed since a beginning of zooming, said CPU supplying said motor with current of the highest pulse duty factor of said first to fourth driving currents for increasing the rotary torque of said motor when said CPU judges that said zoom lens has a position different from said limit positions of telephotography and wide-angle photography even after the lapse of a predetermined period of time by referring to said elapsed time, while said zoom lens is zoomed by supplying said motor with a current of less than the highest pulse duty factor of said first to fourth driving currents.

14. A zooming control apparatus as defined in claim 13, wherein said CPU stops supplying said motor with said first driving current when said CPU judges that said zoom lens has a position different from said limit positions of telephotography and wide-angle photography even after the lapse of a predetermined period of time by referring to said elapsed time, while said zoom lens is zoomed by supplying said motor with a current of the highest pulse duty factor of said first to fourth driving currents.

15. A zooming control apparatus for a camera for zooming a zoom lens to change the focal length thereof as desired, in which the work required to effect zooming differs in opposite zooming directions, comprising:

a motor for moving said zoom lens;

a first switch operable for zooming said zoom lens in a direction that requires greater work;

a second switch operable for zooming said zoom lens in a direction that requires less work;

control means for supplying said motor with either a first or a second driving electric current in accordance with signals supplied by said first and second switches, said first and second driving currents having an electric power which keeps the speed of movement of said zooming lens the same in both said opposite zooming directions.

16. A zooming control apparatus as defined in claim 15, wherein said electric power is controlled by changing a pulse duty factor.

* * * * *